United States Patent [19]

Pecoraro et al.

[11] Patent Number: 4,744,809
[45] Date of Patent: May 17, 1988

[54] METHOD AND APPARATUS FOR HOMOGENIZING FLAT GLASS

[75] Inventors: George A. Pecoraro, Lower Burrell; Joseph A. Gulotta, New Kensington, both of Pa.

[73] Assignee: PPG Industries, Inc., Pittsburgh, Pa.

[21] Appl. No.: 26

[22] Filed: Jan. 2, 1987

[51] Int. Cl.⁴ ............................................. C03B 5/187
[52] U.S. Cl. ................................. 65/135; 65/99.3; 65/178; 65/179; 65/182.3; 65/182.5
[58] Field of Search ............... 65/99.3, 178, 179, 182.3, 65/182.5, 99.2, 99.4, 135

[56] References Cited

U.S. PATENT DOCUMENTS

| | | |
|---|---|---|
| 1,898,039 | 2/1933 | Eckert . |
| 2,467,809 | 4/1949 | Cannon et al. . |
| 3,231,351 | 1/1966 | Brichard . |
| 3,241,937 | 3/1966 | Michalik et al. . |
| 3,432,283 | 3/1969 | Galey . |
| 3,450,516 | 6/1969 | Emhiser et al. . |
| 3,498,779 | 3/1970 | Hathaway ................. 65/178 X |
| 3,843,346 | 10/1974 | Edge . |
| 4,046,546 | 9/1977 | Hynd . |
| 4,047,918 | 9/1977 | Heithoff . |
| 4,062,666 | 12/1977 | Tilton . |
| 4,082,528 | 4/1978 | Lythgoe et al. . |
| 4,203,750 | 5/1980 | Shay . |
| 4,395,272 | 7/1983 | Kunkle et al. . |
| 4,493,557 | 1/1985 | Nayak et al. . |
| 4,600,426 | 7/1986 | Schwenninger . |

FOREIGN PATENT DOCUMENTS 0698931 11/1979 U.S.S.R. ............................... 65/178

OTHER PUBLICATIONS

D. Bottger, "Platinum Forehearths and the Production of Thin Glass," Glass International, Mar. 1986, pp. 11, 12.

"Platinum Technology," Eglasstrek Patent Promotion and Awarding GmbH, West Germany (no publication date).

Primary Examiner—Arthur Kellogg
Attorney, Agent, or Firm—Dennis G. Millman

[57] ABSTRACT

Stirring of glass of high optical quality is effected by initiating forming of the glass, such as by the float process, at relatively high temperatures immediately after the glass has been stirred. Preferably, during and/or following the stirring operation contact between the molten glass and ceramic refractories is minimized. This is preferably accomplished by providing a layer of molton metal (e.g., tin) on the bottom of the stirring chamber.

41 Claims, 4 Drawing Sheets

METHOD AND APPARATUS FOR HOMOGENIZING FLAT GLASS

BACKGROUND OF THE INVENTION

Glass that is used for glazing vision openings such as windows in buildings and automobiles has high standards for optical uniformity. This type of glass, generally characterized as "flat glass" even though the product may be somewhat curved, is required to transmit images free from distortion that would be displeasing to the human eye. Therefore, it is desired to provide flat glass with a high degree of compositional uniformity so as to avoid any localized differences in the index of refraction that would cause distortion in a transmitted image. The standards for flat glass are considerably higher than for other types of glass, such as pressed and blown ware (e.g., bottles) or fibers, for which the transmitted image quality is not a major consideration in their normal applications.

It is known that a major cause of compositional inhomogeneity in glass is contamination of the molten glass by the refractories that contact the glass during the melting process. The slow but constant erosion of the ceramic refractory materials by the molten glass creates streaks of differing composition within the molten glass. In order to minimize the amount of these inhomogeneities in the product glass stream withdrawn from a melting furnace, a flat glass making operation usually provides a large volume of molten glass within the melting furnace and withdraws the product stream from a surface portion that has had little or no refractory contact immediately before withdrawal, and the bulk of the glass is recirculated to disperse the refractory contamination. This technique has only limited success, and is costly due to the large size of melting vessels required and the energy required to maintain the recirculating mass of molten glass. It would be desirable to reduce these costs and to improve the homogeneity of flat glass.

Stirring has long been employed to improve homogeneity in glass melting opeations. In making bottle glass or the like, it is common to stir the molten glass in a forehearth immediately prior to forming the glassware, but stirring at a similar stage in a flat glass making operation has been found in the past to worsen rather than improve the distortion quality of the product glass. This difference is due not only to greater tolerance of distortion in bottle glass or the like, but is also due to the fact that flat glass is generally formed at lower temperatures than bottle glass, and stirring is apparently ineffective at these lower temperatures. Flat glass is sometimes stirred, such as shown in U.S. Pat. Nos. 4,046,546 and 4,047,918, but the stirring is generally in hotter regions of the melting furnace considerably upstream from the region where forming of the flat product is initiated. Therefore, in such cases, a substantial distance between the stirring and the flat forming region must be provided for molten glass to cool to the forming temperature, and as a result, refractory contact occurs subsequent to the stirring operation. It would be desirable to stir flat glass immediately prior to forming, so as to improve homogeneify of the glass without otherwise worsening the distortion quality of the glass.

The ability to stir container glass immediately prior to forming affords the opportunity to add coloring agents to the glass at that point. This is advantageous in that it enables the glass color to be changed quickly and inexpensively because only a small volume of residual glass is involved during the color change. Because of the difficulties with stirring flat glass at a downstream location, as described above, that method of changing the glass color has not generally been available to flat glass manufacturers. Instead, the coloring agents for flat glass are usually fed to the melting furnace mixed with the other raw ingredients. As a result, all of the molten glass contained in the melting furnace has a given color, and changing the color requires substantially the entire contents to be flushed from the furnace. This method of changing colors is time-consuming and costly, and it would be desirable to provide a more effective way of changing colors in a flat glass melting operation.

SUMMARY OF THE INVENTION

The present invention provides a method and apparatus for stirring flat glass immediately prior to forming the glass into a high optical quality flat glass product. Inhomogeneities present in the molten glass, such as those due to contact with refractory surfaces, are thus alleviated by the stirring at a location where there is little or no opportunity for subsequent introduction of additional inhomogeneities before the glass is formed into a sheet. In the present invention the optical quality of flat glass is improved by stirring the molten glass before its temperature has fallen to its forming temperature from the refining temperature. For a typical soda-lime-silica flat glass composition, it has been found desirable to perform the stirring while the glass temperature is at least 2200° F. (1200° C.). Because this temperature occurs significantly upstream from the location where forming begins in a typical commercial flat glass operation, measures are required to avoid reintroducing distortion-producing contamination between the stirring location and the beginning of the forming operation. These measures include two options: beginning the forming operation at exceptionally high temperatures, or preventing contaminating refractory contact while the glass cools to a more conventional forming temperature.

Initiating the forming of the glass into a flat glass sheet at or near the temperatures employed for stirring the glass in the present invention is problematic with a conventional float forming process because the viscosity of the glass at such temperatures is too low for effective use of mechanical attenuating means. The relatively high temperatures involved would also negatively affect the erosion rate of the delivery structures employed with conventional float forming operations, to which the molten glass is usually introduced at temperatures below about 2000° F. (1100° C.). But it has now been found that homogenization without degrading the product quality below flat glass standards can be achieved if the moltan glass is stirred at relatively high temperatures and immediately transferred to a forming operation that can accommodate glass at such temperatures. An example of a suitable flat glass forming process is that disclosed in U.S. Pat. No. 4,395,272 (Kunkle et al.), wherein a pressurized chamber is employed to attenuate the glass to the desired thickness. Because such a forming process can accommodate glass at or slightly below the stirring temperature, forming of the glass into a flat ribbon can be initiated a short distance downstream from the stirring operation, thus obviating the need for an intermediate passageway of significant length in which the uniformity of the glass might become degraded. In the preferred embodiments of the present invention, the molten metal support may begin upstream from the forming chamber, most preferably extending through the stirring zone into the forming chamber, thereby eliminating a major refractory contact area. Such an arrangement also advantageously permits the elimination of a lip or threshold at the point of entry into the forming chamber, thereby eliminating an element that is subjected to a relatively high rate of wear in a conventional float forming operation.

An alternative approach of the present invention, separate from forming the glass at high temperatures, is to avoid contaminating refractory contact with the glass downstream from the stirring zone as it is cooling to an appropriate forming temperature while advancing toward the forming chamber. Thus, the channel between the stirring zone and the forming chamber may be lined with a noncontaminating material such as platinum, molybdenum, or fused quartz. Alternatively, the bottom of the channel may be provided with a layer of molten metal such as tin, which may be separate from or an extension of the molten metal in the forming chamber. Although not essential, the protective layer may also be provided within the stirring zone. In particular, providing molten metal as the support surface for the glass in the stirring zone has been found to be advantageous in that it reduces friction of the vessel on the molten glass. This results in a faster average throughput speed through the stirring zone and enables product changes or color changes to be effected more rapidly.

The present invention is in principle independent of the particular flat glass forming technique employed, but it can be employed with particular advantage in connection with the float forming process, wherein a continuous ribbon of flat glass is formed by casting molten glass onto the surface of a pool of molten metal. Other examples of flat glass forming methods include the well known sheet drawing and plate rolling processes.

The molten glass being fed to the stirring chamber of the present invention may be melted and refined by any technique suitable for producing flat glass but because the stirring and preferably the forming operations are initiated at exceptionally high temperatures, the temperature conditioning section of the melting furnace may be shorter than usual. It is an advantage that in the present invention the stirring is applied to the forwardly flowing stream of glass being delivered to the forming chamber rather than to a recirculating mass of glass. For this reason, it is preferred to provide means to prevent return flow of glass from the stirring zone toward the melter. In this regard, a most advantageous arrangement whereby return flow of glass is precluded is to provide a vertical pouring of molten glass into the stirring zone. A vertical entry into the stirring zone avoids the materials problem inherent in providing a barrier to prevent rqturn flow that would be entailed in a horizontally entering mode. Additionally, vertical entry is compatible with unit refining techniques, such as that disclosed in U.S. Pat. No. 4,600,426 (Schwenninger). In that arrangement, glass progresses downwardly through a vertically elongated refining vessel and drains from a bottom portion. Such an arrangement can advantageously drain refined glass directly into the stirring chamber of the present invention.

The stirring arrangement of the present invention can not only improve the optical quality of flat glass, but can also be employed to homogenize colorants or other additives to the glass after the glass has been refined. As a result, the glass color or composition can be changed rapidly and inexpensively because of the small volume of residual glass affected during a product change.

The aspect of the invention that relates to stirring on a molten metal support has advantages that are not tied to production of higher quality glass products such as flat glass. The low frictional resistance to the flow of glass and the resulting ease of product changes would be advantageous as well to the manufacture of other types of glasses such as containerware and tableware.

Addition details of these and other advantages of the present invention will become apparent from the drawings and detailed description which follows.

DETAILED DESCRIPTION

Figure 1:
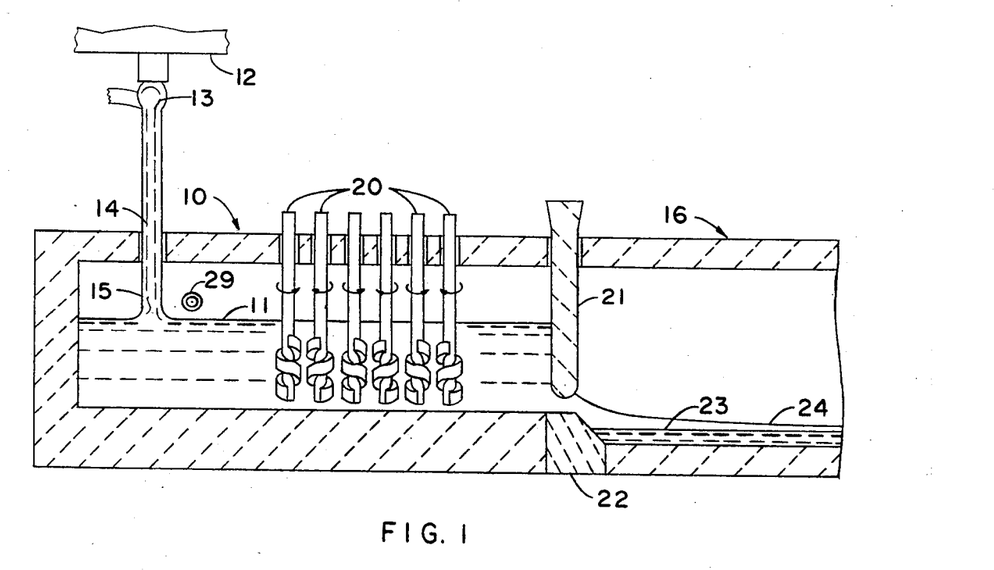
FIG. 1 is a longitudinal, cross-sectional view of a stirring chamber in accordance with the present invention, from which the stirred molten glass is delivered to a high temperature flat glass forming chamber. Molten glass is fed to the stirring chamber vertically from a refining vessel.

In FIG. 1 there is shown an embodiment of the present invention that includes a stirring chamber 10 holding a volume of refined molten glass 11 that is continuously flowing into the chamber from a melting and refining furnace of any suitable type known in the art.

As shown, the preferred arrangement provides for the incoming stream of glass to flow vertical into the stirring chamber 10 so as to preclude return flow. In the particular example depicted, the vertical flow is from a bottom drain of a refining vessel 12 or other upstream container. The flow from the vessel 12 in the arrangement shown may be regulated by means of a valve member 13 which may be of the type disclosed in U.S. Pat. No. 4,600,426 (Schwenninger). A useful concept shown in the figure, which is not part of the present invention, is the provision of a rod 14 extending downwardly from the valve member 13, which assures a regular streamlined path for the vertically flowing glass so as to avoid entrapment of air into the glass as it enters the body of glass 11 contained within the stirring chamber.

As in all embodiments of the present invention, the glass is preferably above 2200° F. (1200° C.) during stirring. Therefore, the stream of glass 15 entering the stirring chamber is at least that temperature. Preferably, no significant amount of heating is employed in the stirring chamber, and therefore, the incoming stream of glass 15 would typically have a temperature somewhat greater than the minimum stirring temperature, with the glass cooling slightly as it passes from the refiner 12 to the forming chamber 16. There is no essential upper limit on the temperature of the glass entering the stirring chamber, but as a practical matter, it is most likely that the glass would be somewhat below the peak refining temperature imparted to the glass in the upstream refining process, which would typically be no greater than about 2800° F. (1500° C.). As a further practical matter, permitting the glass to cool substantially before entering the stirring chamber, for example to about 2400° F. (1300° C.) or less, might be preferred in some cases to extend the life of elements such as stirrers that come into contact with the molten glass.

The present invention is not limited to any particular structure of stirrer, any of the various mechanical devices that have been proposed for stirring molten glass in the prior art being usable. Some arrangements may be more effective than others in homogenizing the glass, but the number of stirrers and their speed of rotation can be selected to compensate for variations in efficiency. The particular stirrer structure shown in each of the drawings here is a preferred example in that it provides a strong mixing action and is a type that is readily available commercially. Another embodiment that may be suitable is that disclosed in U.S. Pat. No. 4,493,557 (Nayak et al.). Each of the stirrers 20 as depicted in FIG. 1 is comprised of a helical stirring portion at the bottom of a shaft, both of which may be cast from a ceramic refractory material. In order to avoid drawing air into the melt, it is preferred to rotate the helical stirrers in such a direction that they draw the molten glass upwardly toward the surface. This also serves to prevent additives that may be deposited onto the surface of the melt in the stirring chamber from being swept prematurely, and in concentrated streaks, into the zone of active stirring. Drive means, (not shown), for rotating the stirrers may be of any suitable type employed in the art for this purpose, and the stirrers may be driven separately or in groups. For the sake of convenience, the stirrers in a transverse row, for example, may be rotated in the same direction, and to enhance shearing forces imparted to the glass it is preferred to rotate the adjacent transverse row in the opposite direction as shown in the drawings. It should be understood, however, that any pattern of rotation could be employed for the present invention as long as adequate homogenization is achieved. In order to achieve good homogeneity, it is considered desirable to stir substantially the entire transverse cross-sectional area of the molten glass in the stirring chamber, and the number and size of stirrers may be selected accordingly. Thus, in the embodiment shown in FIG. 1, the helical portion of each stirrer corresponds to virtually the depth of the molten glass, and an array of closely spaced stirrers is provided that actively affects substantially the full width of molten material in the stirring chamber. The degree of homogenization is also influenced by the amount of agitation experienced by each increment of the melt and by the throughput rate of the melt. Thus, a plurality of rows of stirrers is preferred so that each increment of glass is repeatedly subjected to mixing forces as it passes along the length of the stirring chamber. The number of rows of stirrers will depend upon the degree of homogenization desired, and the throughput rate of glass. As a general guideline, one stirrer may be provided for each 10 tons per day of glass produced for average quality flat glass. Obviously, for some applications lower quality requirements may permit the use of fewer stirrers. On the other hand, the use of a larger number of stirrers will usually produce improved results. Implying a larger number of stirrers than required has no significant drawback other than the cost of the stirrers.

The walls of the stirring chamber 10 in the FIG. 1 embodiment may be made of fusion cast ceramic refractory material, contact with which can contaminate the molten glass to an extent that perceptible optical distortion can be produced in the flat glass product. Accordingly, in this embodiment the molten glass is delivered to a forming chamber 16 immediately after being stirred so as to minimize the area of refractory contacted by the glass after being stirred. In FIG. 1, a vertically adjustable tweel 21 regulates the flow of molten glass from the stirring chamber over a threshold member 22 onto a pool of molten metal 23, which is usually comprised chiefly of molten tin. The glass forms a ribbon 24, which is reduced in thickness and cools as it is drawn along molten metal pool until it cools to a temperaturs sufficient to be withdrawn from the molten metal without marring the surface of the glass ribbon. Because the molten glass is stirred at relatively high temperatures, and is immediately thereafter delivered to the forming chamber, the glass enters the forming chamber at a temperature higher than is conventional for a float type forming process. The temperature of the glass may fall somewhat from the stirring temperature, which is above 2200° F. (1200° C.), but will typically enter the forming chamber before the glass has cooled to a conventional float process delivery temperature of about 1900° F. to 2000° F. (1040° C. to 1090° C.). Typically the glass entering the forming chamber in the FIG. 1 embodiment of the present invention, will be at a temperature of at least about 2100° F. (1150° C.), at which temperature the viscosity of the glass does not lend itself to engagement by mechanical means for attenuating the glass ribbon to the desired thickness in the forming chamber. Therefore, a forming process that employs elevated pressure within the forming chamber, preferably the process disclosed in U.S. Pat. No. 4,395,272 (Kunkle et al.), lends itself to use with those embodiments of the present invention in which the stirred glass is delivered at relatively high temperature to the forming chamber. Although not as advantageous, other pressurized glass forming processes may be used, such as those disclosed in U.S. Pat. No. 3,241,937 (Michalik et al.), or U.S. Pat. No. 3,432,283 (Galey).

The threshold 22 is preferably made of a noncontaminating material such as fused quartz, and its length in the transverse direction across the direction of flow of glass may be substantially the full width of the ribbon being formed in accordance with the teachings of U.S. Pat. No. 3,843,346 (Edge et al.). Additional details of the structure of a threshold suitable for use in such a process may be found in U.S. Pat. No. 4,062,666 (Tilton).

For adding coloring agents or other additives to the molten glass in the stirring chamber, a screw feeder 29 may be provided, which may, for example, extend horizontally from the side wall near the location at which the stream of glass 15 enters the stirring chamber. Coloring agents are readily available commercially and are usually in the form of concentrates, which may include a coloring compound such as a metal oxide mixed with a fluxing powder and bound with sodium silicate or some other binder. Additives for purposes other than changing the color may be introduced into the molten glass at the stirring chamber. Thus, a different glass composition could be produced without having to change the composition in the melting and refining stages.

Figure 2:
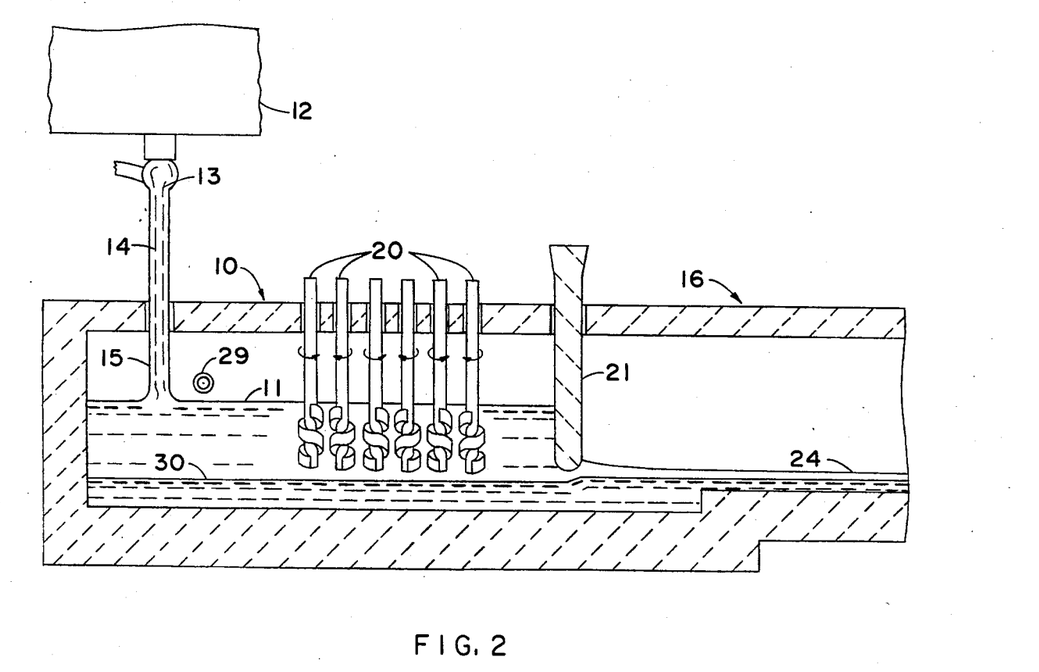
FIG. 2 is a longitudinal, cross-sectional view of a preferred embodiment of the present invention wherein a pool of molten metal provides a support surface for the molten glass extending continuously through the stirring chamber and into a high temperature flat glass forming chamber.

FIG. 2 depicts the preferred embodiment of the present invention. The embodiment of FIG. 2 is the same as that of FIG. 1, except that no threshold member separates the stirring chamber from the forming chamber, and the molten metal 30 extends throughout the stirring chamber 10 as well as forming chamber 16. This arrangement is preferred because refractory contact with the stirring chamber bottom and with the threshold is eliminated, thereby providing additional assurance that inhomogeneities are not reintroduced into the stirred glass. Furthermore, eliminating the threshold eliminates an element that is subject to maintenance and occasional replacement, particularly at high temperatures such as are involved in the preferred embodiments here. It should be understood that the molten metal layer 30 need not extend throughout the entire stirring chamber in order to achieve the advantages of avoiding refractory contact, but that only portions of the stirring chamber may be covered, in particular the portion downstream from the stirrers 20.

Apart from providing a noncontaminating surface for the major area contacted by the molten glass, the use of molten metal as the support surface in the stirring chamber has other advantages. It has been found that the molten metal surface provides very little frictional drag on the molten glass moving thereover. As a result, the glass moves downstream through the stirring chamber relatively uniformly throughout its cross-section, so that any change in color or composition can be carried out relatively quickly with little waste glass during the transition.

Figure 3:
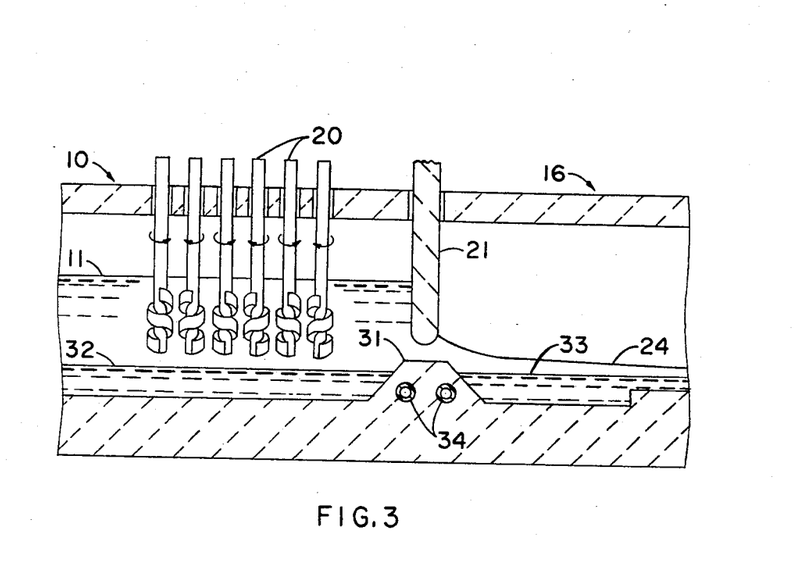
FIG. 3 is a longitudinal, cross-sectional view showing a variation of the FIG. 2 arrangement, wherein the molten metal support in the stirring chamber is separated from that in the forming chamber by a threshold member.

FIG. 3 shows a slight variation of the FIG. 2 embodiment, wherein a refractory threshold 31 separates the molten metal support into a stirring chamber portion 32 and a forming chamber portion 33. Although in most cases it would be desired to avoid a threshold member, the arrangement shown in FIG. 3 may be useful in situations where it is desired to isolate the molten metal in the stirring chamber from the molten metal in the forming chamber so as to provide different conditions in the two zones. The life of the threshold 31 may be extended by providing cooling conduits 34 therein.

Figure 4:
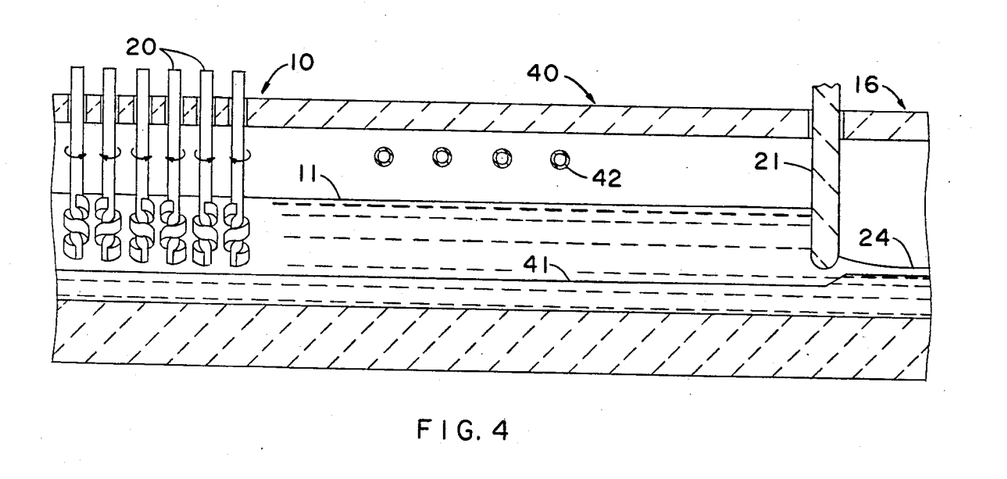
FIG. 4 is a longitudinal, cross-sectional view of an embodiment of the present invention that includes a molten metal support surface in the stirring chamber and the forming chamber, and provides a cooling zone therebetween for the molten glass temperature to be reduced to a conventional flat glass forming temperature.

Delivering stirred glass to a forming chamber at elevated temperatures is considered to be an advantageous feature of the preferred embodiments of the present invention, but some of the advantages of the invention can be obtained when the glass is delivered to a forming chamber at more conventional forming temperatures if undue contamination from refractory contact can be avoided after stirring while the glass is cooling to a conventional forming temperature. An example of such an arrangement is shown in FIG. 4, where a cooling zone 40 is provided between the stirring zone 10 and the forming chamber 16. Bottom refractory contact is avoided by providing a molten metal layer 41 (e.g., molten tin), which may extend continuously from the stirring chamber through the cooling zone and into the forming chamber as shown in FIG. 4. The continuous molten metal layer 41 is advantageous for the sake of avoiding threshold members, but it should be understood that two or more separate molten metal zones could be maintained by providing a separating member such as a threshold.

Because maintaining flat glass optical quality standards entails stirring the glass at relatively high temperatures in accordance with the present invention, the function of the cooling zone 40 in the FIG. 4 embodiment is to permit the glass temperature to fall from the stirring temperature to a forming temperature. As previously mentioned, for a typical soda-lime-silica flat glass composition the stirring temperature is preferably above 2200° F. (1200° C.) and the forming temperature is typically below 2000° F. (1100° C.). Therefore, the length of the cooling zone is selected so as to provided sufficient residence time for the glass temperature to fall the requisite amount. Unaided cooling through the refractory walls of the cooling zone may be sufficient, but in some cases it may be desired to shorten the length of the cooling zone by providing cooling means, such as the cooling pipes 42 depicted in FIG. 4, in the space above the molten glass in the cooling zone 40. Alternatively, forced air currents may be employed to cool the glass to the forming temperature. In this example, the process for forming the molten glass into a flat ribbon need not involve elevated pressure, but can be any conventional flat glass forming technique such as a conventional float forming technique employing mechanical attenuating means that grip marginal edge portions of the ribbon. Entry to the forming chamber 16 in FIG. 4, may advantageously involve merely a tweel 21 that regulates glass flow over the molten metal support surface 41.

Figure 5:
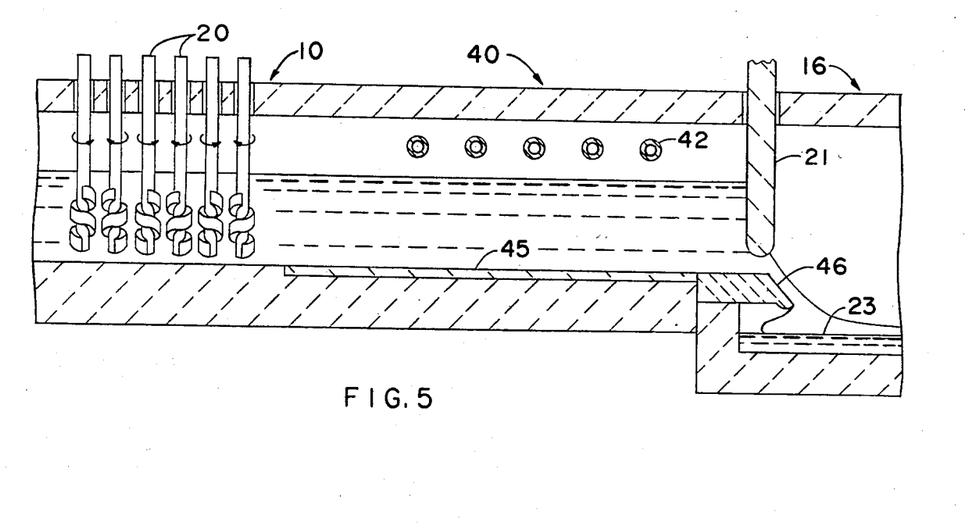
FIG. 5 is a longitudinal, cross-sectional view of an alternative embodiment incorporating a cooling section between a stirring zone and a forming chamber employing conventional flat glass forming temperatures, and in the cooling zone a noncontaminating surface other than molten metal is provided.

Molten metal is the preferred support for maintaining the stirred glass free from distortion caused by contact with refractory material, but a variation of the FIG. 4 arrangement is shown in FIG. 5, wherein the cooling chamber 40 is provided with a solid, noncontaminating lining 45. The lining 45 may be comprised of clear fused quartz or platinum for example, and may be applied to the side walls as well as the bottom of the chamber. Although, the lining 45 is shown in FIG. 5 as being limited to the cooling zone 40, it should be apparent that the lining could extend into the stirring zone 10 as well. The use of a solid protective lining 45 between the stirring region and the forming chamber is depicted in FIG. 5 in connection with an embodiment that includes an extended cooling zone 40, so that the molten glass can be delivered to the forming chamber at a conventional forming temperature, but it should be understood that the use of such a lining could also be applied an embodiment such as that shown in FIG. 1. In the FIG. 5 embodiment, the stirred and cooled molten glass may be delivered to the forming chamber by any conventional delivery structure, such as the pouring type delivery that is shown in the drawing by way of example. In that arrangement, the tweel 21 regulates the flow of molten glass over a lip member 46 from which the molten glass falls freely onto the molten metal in the forming chamber 16. Instead, a delivery arrangement that does not involve free fall of the molten glass may be used such as the full width delivery arrangement shown in U.S. Pat. No. 4,062,666 (Tilton).

Figure 6:
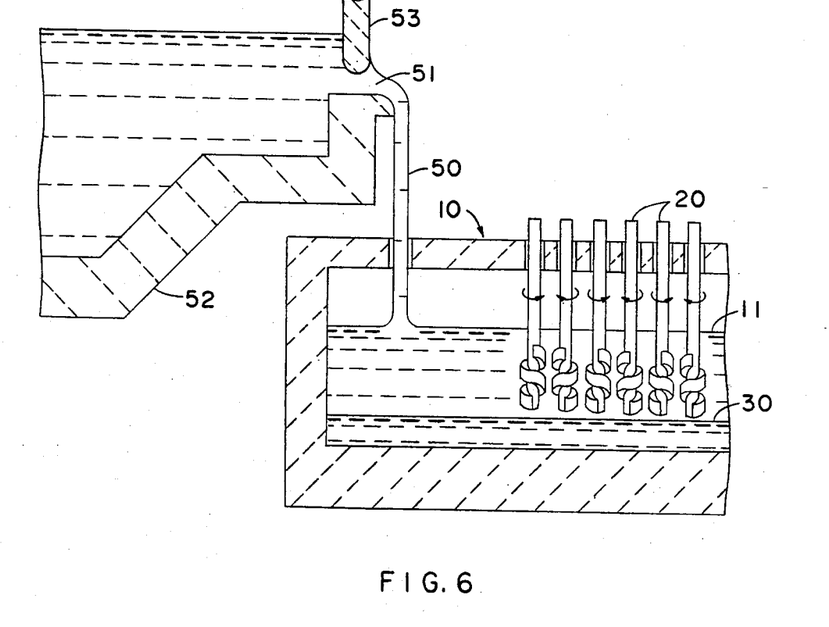
FIG. 6 is a longitudinal, cross-sectional view of an alternative arrangement for feeding refined molten glass to the stirring chamber of the present invention, wherein a conventional tank type melting and-refining furnace may supply molten glass to the stirring chamber by way of vertical pouring.

The arrangement for vertically feeding molten glass to the stirring chamber described in connection with FIG. 1 may be applied to each of the embodiments described herein, and in FIGS. 6, 7, and 8 there are shown examples of alternative arrangements for feeding glass to the stirring chamber which could be used in association with any of the disclosed embodiments. In FIG. 6, the molten glass feeding arrangement retains the preferred characteristic of passing the molten glass stream 50 vertically into the stirring chamber 10. Unlike FIG. 1, however, the vertical stream is not exiting from a bottom drain of a refining vessel, but rather is passing from an exit 51 at an end of more conventional horizontally configured tank type refining vessel 52. A gate valve 53 may regulate the flow of molten glass from the refining vessel 52.

Figure 7:
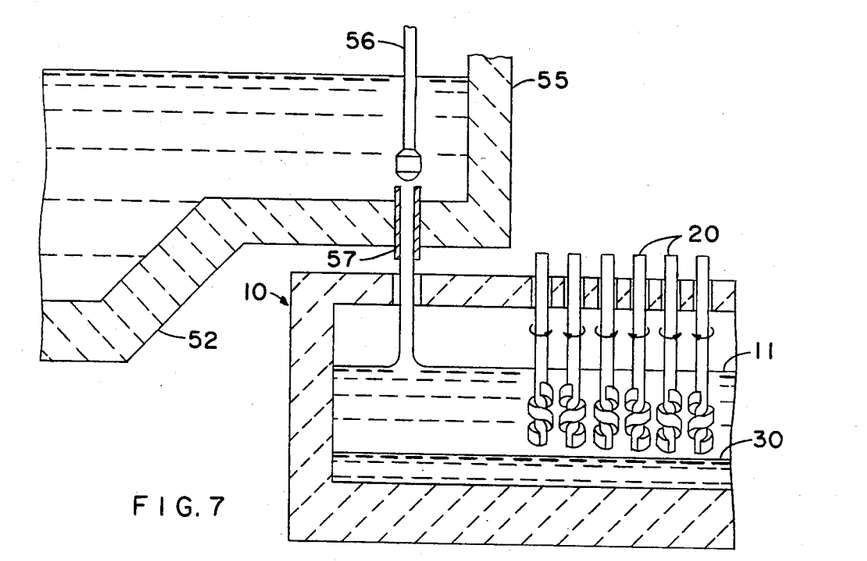
FIG. 7 is a longitudinal, cross-sectional view of another alternative molten glass feeding arrangement similar to FIG. 6, but with a bottom drain opening controlled by a plunger.

FIG. 7 depicts a similar vertical transfer of molten glass from a conventional refining vessel 55 to a stirring chamber 10. In the embodiment glass flow is regulated by means of a plunger 56 coacting with a drain tube 57 extending through the bottom of the vessel 55. The drain tube may be fabricated of a refractory metal such as platinum.

Figure 8:
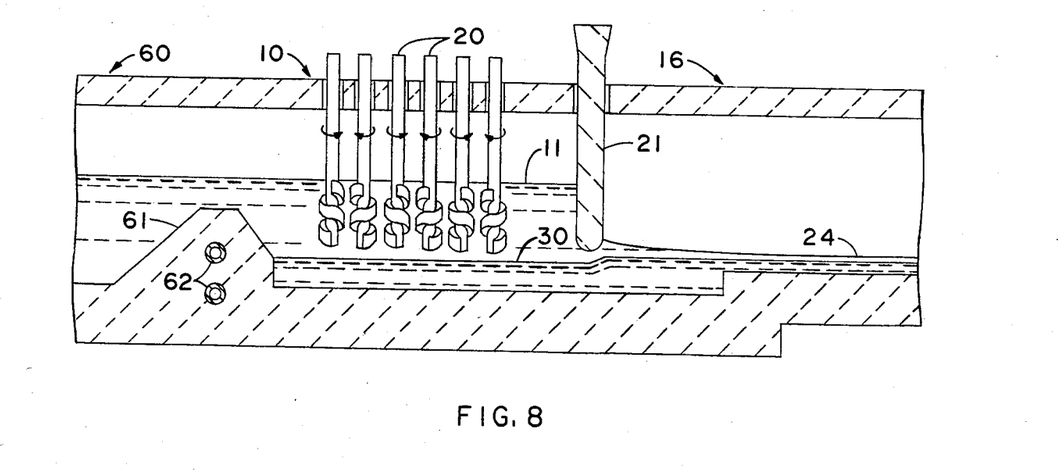
FIG. 8 is a longitudinal, cross-sectional view of another arrangement for feeding molten glass to the stirring chamber of the present invention, wherein refined molten glass is fad horizontally to the stirring chamber over a threshold member.

An example of an arrangement that provides horizontal entry of molten glass into the stirring chamber 10 is shown in FIG. 8. In this arrangement the stirring chamber 10 is horizontally aligned with an end of a conventional tank type refining vessel 60, with a submerged partition 61 separating the chambers and retarding return flow of molten glass out of the stirring chamber. The integrity of the partition 61 may be reinforced by cooling conduits 62. The FIG. 8 embodiment is, otherwise, the same as that shown in FIG. 2.

Soda-lime-silica glass as referred to herein may generally be characterized by the following compositional ranges:

|  | Weight % |
| --- | --- |
| SiO$_2$ | 70-74 |
| Na$_2$O | 12-16 |
| CaO | 8-12 |
| MgO | 0-5 |
| Al$_2$O$_3$ | 0-3 |
| K$_2$O | 0-3 |
| BaO | 0-1 |
| Fe$_2$O$_3$ | 0-1 |

Small amounts of colorants, refining aids, or impurities may also be present. Most float glass falls within the following ranges:

|  | Weight % |
| --- | --- |
| SiO$_2$ | 72-74 |
| Na$_2$O | 12-14 |
| CaO | 8-10 |
| MgO | 3-5 |
| Al$_2$O$_3$ | 0-2 |
| K$_2$O | 0-1 |
| Fe$_2$O$_3$ | 0-1 |

The operating temperatures disclosed for the present invention relate to the float glass composition set forth above. For other compositions the appropriate temperatures for stirring and forming will vary in accordance with the temperature/viscosity relationship of the particular glass composition. In order to extrapolate the temperatures disclosed herein to other glass compositions, the relationship between temperature and viscosity of a specific example of soda-lime-silica float glass is set forth below:

| Viscosity (poise) | Temperature |
| --- | --- |
| 100 | 2630° F., 1443° C. |
| 1,000 | 2164° F., 1184° C. |
| 10,000 | 1876° F., 1024° C. |
| 100,000 | 1663° F., 906° C. |

Other variations that are known to those of skill in the art may be resorted to within the scope of the invention as defined by the claims that follow.

We claim:

1. A method of making glass comprising:
   feeding a stream of molten glass onto a molten metal support;
   stirring the molten glass while supported on the molten metal so as to substantially homogenize the glass; and
   passing the homogenized glass to a forming operation.

2. The method of claim 1 wherein the forming operation forms the glass into a flat sheet of glass.

3. The method of claim 2 wherein the glass is supported on a layer of molten metal during the forming operation.

4. The method of claim 3 wherein the glass is stirred at a temperature greater than 2200° F. (1200° C.) and the forming operation is initiated while the glass temperature is at least 2100° F. (1150° C.).

5. The method of claim 4 wherein during the forming operation is subjected to pressure above atmospheric so as to reduce its thickness.

6. The method of claim 3 wherein the glass is continuously supported on molten metal from the initiation of stirring until the glass has been formed into a flat glass ribbon.

7. The method of claim 1 wherein the molten metal comprises tin.

8. The method of claim 1 wherein immediately prior to stirring a substance is added to the molten glass to modify the characteristics of the glass.

9. The method of claim 8 wherein the substance added to the glass is a coloring additive.

10. A method of making flat glass comprising:
    feeding a stream of melted and refined molten glass from a melting and refining stage to a separate stirring chamber;
    stirring the glass at a temperature greater than 2200° F. so as to substantially homogenize the glass while preventing return flow to the melting and refining stage; and initiating forming of the homogenized glass into a flat ribbon while the glass temperature is at least 2100° F.

11. The method of claim 10 wherein the glass is supported on a layer of molten metal while it is being stirred.

12. The method of claim 11 wherein the molten metal comprises tin.

13. The method of claim 10 wherein the glass is formed into a flat ribbon while supported on molten metal.

14. The method of claim 13 wherein the thickness of the glass ribbon is reduced during forming by imposing a pressure greater than atmospheric.

15. The method of claim 10 wherein the molten glass, after being stirred and befora forming is initiated, is passed through a channel in which the molten glass is maintained out of contact with contaminating ceramic refractories over the major portion of the surface area of the channel contacted by the molten glass.

16. The method of claim 15 wherein the bottom of the glass in the channel is maintained out of contact with contaminating ceramic refractory contact.

17. The method of claim 16 wherein the molten glass in the channel is in contact with molten metal.

18. The method of claim 17 wherein the molten metal is comprised of tin.

19. A method of making glass or the like comprising:
melting material to a molten, glassy state;
adding to the molten material an additional constituent;
passing the molten material onto a molten metal support; and
stirring the molten material while supported on the molten metal so as to distribute the additional constituent in the molten material.

20. The method of claim 19 wherein the additional constituent is a coloring additive.

21. The method of claim 19 wherein the additional constituent is added to the molten glass after the molten glass has been passed onto the molten metal support and before the stirring has been completed.

22. The method of claim 19 wherein the molten glass after being stirred is formed into a flat glass ribbon.

23. The method of claim 22 wherein the glass is formed into a flat ribbon while supported on molten metal.

24. The method of claim 22 wherein the glass is a soda-lime-silica composition.

25. Apparatus for processing glass comprising:
a vessel adapted to hold a pool of molten metal;
means for feeding molten glass onto the pool of molten metal; and
means for stirring the molten glass in the vessel on the molten metal pool.

26. The apparatus of claim 25 wherein the molten metal pool communicates with an adjacent chamber adapted to form molten glass into a flat ribbon.

27. The apparatus of claim 26 further including a vertically adjustable barrier between the stirring vessel and the forming chamber adapted to regulate flow of molten glass from the stirring vessel to the forming chamber.

28. The apparatus of claim 25 wherein the means for stirring includes a plurality of stirrers in each of a plurality of rows.

29. The apparatus of claim 28 wherein the stirrers have a helical blade configuration.

30. The apparatus of claim 25 further including means for feeding additive materials to the molten glass in the stirring vessel.

31. The apparatus of claim 25 further including forming chamber for receiving molten glass from the stirring vessel and adapted to contain a pool of molten metal, the molten metal in the stirring vessel being separated from the molten metal in the forming chamber by a threshold member.

32. The apparatus of claim 25 wherein the stirring vessel includes means for cooling the glass.

33. Apparatus for manufacturing flat glass comprising:
furnace means for melting and refining glass;
a stirring chamber adapted to receive molten glass from the furnace means, the stirring chamber being vertically separated from the furnace means at a lower elevation such that return flow of molten glass from the stirring chamber to the furnace means is avoided, and means to stir the glass within the stirring chamber; and
a forming chamber adapted to receive molten glass from the stirring chamber and to hold a pool of molten metal such that the molten glass may be formed into a flat ribbon on the molten metal.

34. The apparatus of claim 33 wherein the stirring chamber bottom is provided with means to separate the molten glass from contact with ceramic refractory material.

35. The apparatus of claim 34 wherein the stirring chamber bottom is provided with a layer of molten metal.

36. The apparatus of claim 33 wherein a sloped surface supports the flow of molten glass from the stirring chamber into the forming chamber.

37. The apparatus of claim 33 wherein a flow path for molten glass from the stirring chamber into the forming chamber is provided that is substantially horizontal.

38. The apparatus of claim 33 further including means to feed additive material to the molten glass in the stirring chamber.

39. The apparatus of claim 33 wherein means for cooling the glass are provided between the stirring means and the forming chamber.

40. The apparatus of claim 33 wherein means are provided between the stirring means and the forming chamber for separating the molten glass from contact with ceramic refractory.

41. The apparatus of claim 33 wherein the stirring means includes a plurality of stirrers in each of a plurality of rows.

* * * * *